(12) United States Patent
Bu et al.

(10) Patent No.: US 7,515,926 B2
(45) Date of Patent: Apr. 7, 2009

(54) DETECTION OF POWER-DRAIN DENIAL-OF-SERVICE ATTACKS IN WIRELESS NETWORKS

(75) Inventors: Tian Bu, Edison, NJ (US); Samphel Norden, Holmdel, NJ (US); Thomas Y. Woo, Red Bank, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 617 days.

(21) Appl. No.: 11/093,457

(22) Filed: Mar. 30, 2005

(65) Prior Publication Data
US 2006/0229022 A1    Oct. 12, 2006

(51) Int. Cl.
H04M 1/00    (2006.01)
(52) U.S. Cl. .................... 455/522; 455/436; 455/552.1; 370/349; 370/331
(58) Field of Classification Search ................. 455/552, 455/522.1, 436
See application file for complete search history.

(56) References Cited

U.S. PATENT DOCUMENTS

| 7,065,067 | B2 * | 6/2006 | Song et al. | 370/338 |
| 2003/0115364 | A1 * | 6/2003 | Shu et al. | 709/246 |
| 2003/0171120 | A1 | 9/2003 | Mustapha | 455/445 |
| 2005/0213553 | A1 * | 9/2005 | Wang | 370/349 |

FOREIGN PATENT DOCUMENTS

EP    1 392 037 A2    12/2003

OTHER PUBLICATIONS

Qingchun Ren et al: "Secure Media Access Control (MAC) in Wireless Sensor Networks: Intrusion Detections and Countermeasures," Sep. 5, 2004, Personal, Indoor and Mobile Radio Communications, 2004. PIMRC 2004, 15th IEEE International Symposium on Barcelona, Spain Sep. 5-8, 2004, Piscataway, NJ, USA, IEEE, pp. 3025-3029, XP010754490; ISBN: 0-7803-8523-3.

Nash, D. C., et al.: "Towards An Intrusion Detection System for Battery Exhaustion Attacks on Mobile Computing Devices," Mar. 8, 2005, Pervasive Computing and Communications Workshops, 2005. PERCOM 2005 Workshops, Third IEEE International Conference on Kauai Island, HI, USA Mar. 8-12, 2005, Piscataway, NJ, USA, IEEE, pp. 141-145, XP010779716 ISBN: 0-7695-2300-5.

(Continued)

Primary Examiner—Matthew D Anderson
Assistant Examiner—Adel Youssef

(57) ABSTRACT

In a wireless network, an architecture for wireless attack resistance (AWARE) detects power-drain denial-of-service (DoS) attacks by generating statistical measures relating the power consumption by a mobile unit and data transmitted to and from the mobile unit during normal operations of the wireless network. The AWARE architecture compares those statistical measures to current measures to detect a DoS attack if the current measure differs from the statistical measure by more than a specified threshold. If a DoS attack is detected, then the AWARE architecture can inhibit communications with the mobile unit to prevent the mobile from consuming too much power. The statistical measure may be an energy efficiency ratio relating the number of bits of data transmitted to or from the mobile unit over a specified time interval to the amount of power consumed by the mobile unit during that time interval.

20 Claims, 3 Drawing Sheets

200

OTHER PUBLICATIONS

Martin, T., et al; "Denial-of-Service Attacks On Battery-Powered Mobile Computers," Mar. 14, 2004, Pervasive Computing and Communications, 2004. Proceedings of the Second IEEE Annual Conference on Mar. 14-17, 2004, Piscataway, NJ, USA, IEEE, pp. 309-318, XP0101689693, ISBN: 0-7695-2090-1.

Jacoby, G., et al: "Battery-Based Intrusion Detection," Nov. 29, 2004, Global Telecommunications Conference, 2004. GLOBECOM '04. IEEE Dallas, TX, USA Nov. 29-Dec. 3, 2004, Piscataway, NJ, USA, IEEE, pp. 2250-2255, XP010757930, ISBN: 0-7803-8794-5.

* cited by examiner

DETECTION OF POWER-DRAIN DENIAL-OF-SERVICE ATTACKS IN WIRELESS NETWORKS

BACKGROUND OF THE INVENTION

1. Field of the Invention

The present invention relates to communications networks, and more specifically, to denial-of-service (DoS) attacks in wireless networks.

2. Description of the Related Art

Denial-of-service (DoS) attacks continue to present a significant challenge to network operators. Recently, the frequency and magnitude of attacks directed toward Internet resources have been steadily increasing. These attacks include the February 2000 attacks on popular Web sites including www.yahoo.com, www.cnn.com, www.ebay.com, and the recent attacks on the core Internet domain name servers (DNSs).

DoS attacks typically involve blasting a network node (e.g., a server) with a volume of traffic that exceeds the node's handling capacity. This volume of traffic invariably disables the operation of the node for the duration of the attack. A more sophisticated type of DoS attack is known as a distributed DoS (DDoS) attack. In DDoS, an attacker intending to launch a DDoS attack begins by subverting a number of nodes (e.g., via well-known security loopholes), effectively making them slaves to the attacker. These compromised nodes are then used as launch points to inject traffic into the network. By summoning a reasonable number of compromised nodes, an attacker can potentially launch a large-scale, network-wide attack by coordinating the traffic from multiple launch points.

There is no dearth of research related to DoS countermeasures. Indeed, a large variety of solutions have been proposed. The current state-of-the-art in defending against DoS attacks includes (1) stateful firewalls (e.g., the PIX router from Cisco Systems of San Jose, Calif.; Netscreen from Juniper Networks of Sunnyvale, Calif.; Firewall-1 from Checkpoint Systems of Redwood City, Calif.), (2) router modifications to support "pushback" (i.e., attempting to install filters from the target of the attack backwards to the source), (3) "traceback" (i.e., attempting to detect the source of the attack), and (4) intrusion-detection mechanisms that look for anomalies or signatures in arriving traffic. More information on pushback, traceback, and intrusion detection can be found in Ioannidis J. and Bellovin S., "Implementing pushback: Router-based defense against DDoS attacks," Proceedings of Network and Distributed Systems Security Symposium, February 2002; Symposium, February 2002; Snoeren A., "Hash-based IP Traceback," Proceedings of ACM SIGCOMM, 2001; and "Snort: Open-source Network Intrusion Detection System", http://www.snort.org, each incorporated herein by reference in its entirety.

Some of these approaches require significant changes to existing network elements and thus may be costly to deploy, while others require collaboration across Internet service providers (ISPs) and thus may be impractical. Nonetheless, these schemes do reduce the threat of wire-line DoS attacks. For example, a common feature of firewalls that prevents connections from being initiated from outside an enterprise LAN, is fairly successful in mitigating the effects of many DoS flooding attacks.

While many solutions exist for wired networks, few solutions exist for wireless networks. The increasing proliferation of wireless devices such as PDAs and mobile phones, along with enabling technologies such as Bluetooth, wireless fidelity (WiFi), universal mobile telecommunications system (UMTS), and third-generation wireless (3G), present new opportunities for DoS attacks. This is because wireless networks include several vulnerabilities that do not exist in wired networks. These vulnerabilities include limited tolerance for traffic due to constrained wireless link bandwidths, a greater processing overhead associated with wireless links due to their relatively complex nature, and limited power associated with wireless client devices.

Traffic: The scarcity of resources combined with the low capacity of wireless links make a wireless network an easy target for a DoS attack. It takes significantly less traffic to overload a wireless link than it does to overload a wired link.

Processing overhead: A typical 3G or UMTS network has several infrastructure elements that perform a host of functions such as power control, resource allocation, paging, etc. The radio network controller (RNC) and the base stations are involved in these activities for each mobile, and, in fast-handoff systems, the overhead on these devices is tremendous. Such devices in wireless networks are typically engineered to handle a limited load associated with a given number of simultaneously active users. Overload, therefore, is a significant concern for the wireless infrastructure.

Limited power supply: Mobile clients in wireless network are usually powered by batteries whose limited lifetimes make them targets for a class of attacks that simply drain the power by making the mobile perform redundant, power-consuming activities. Power drain can quickly quickly render a mobile device inoperable.

An attacker launching a wireless-specific DoS attack can easily exploit these vulnerabilities. There are two key aspects that can enhance and facilitate such wireless attacks when compared to wireline DoS.

Volume of the attack: In a wireline attack, an attacker has to flood large volumes of data onto a network in order to be successful in overwhelming one or more servers. Since this increases the probability of detection of the source of the attack, it renders wireline DoS attacks less effective. A wireless link is easier to overload with substantially less traffic. This provides a dual advantage to the attacker: (1) ease of launching the attack from the attacker's perspective and (2) difficulty in detecting the source of the attack due to the relatively low volume of traffic.

Target of the Attack: In a wired network, the server is typically the target of a DoS attack. Thus, countermeasures have been able to focus on making the server more robust. However, in a wireless network, the intended target of an attack can be one of a number of different elements within the network, including servers, clients, and infrastructure. In a wireless DoS attack, the attacker has increased flexibility, since both infrastructure and mobiles can be easily attacked. The same attack can target multiple mobiles, either by attacking each mobile individually or by targeting the wireless infrastructure for a more widespread effect. Furthermore, advanced wireless architectures such as Evolution Data Only (EV-DO) networks, with always-on mobiles, have increased susceptibility to power-drain attacks.

In a DoS attack on a wired network, it takes a certain amount of time for a server to be disabled, since servers typically have significant bandwidth and processing capacity. However, in a wireless network, mobiles typically have very limited bandwidth and processing capacity, as well as limited battery lifetimes. Thus, an attack that has reached a mobile, has already succeeded in wasting critical resources on the wireless link, the wireless infrastructure, as well as the battery resource at the mobile.

Accordingly, there exists a need for DoS and DDoS attack counter-measures that are specific to the wireless environment and address its characteristic vulnerabilities.

SUMMARY OF THE INVENTION

Problems in the prior art are addressed, in accordance with principles of the present invention, by a method and apparatus for protecting against denial-of-service (DoS) attacks that are directed toward draining power from mobiles in a wireless environment.

In one embodiment, the invention is an Architecture for Wireless Attack REsistance (AWARE) that is added to a wireless network to detect and protect against the wireless DoS (W-DoS) attack. The AWARE architecture includes a profiler, a detector, and a protector. The profiler determines the norms for power consumption as a function of traffic for mobiles within the network. The detector compares these norms with actual values of power consumption vs. traffic experienced by various mobiles within the network. If the actual values exceed one or more specified thresholds, then the detector considers the wireless network to be under attack and the AWARE protector uses existing functions (e.g., blacklisting) that exist within the wireless network, to counter the attack. The AWARE architecture can be collocated with the firewall or distributed among one or more elements of the wireless infrastructure and mobiles themselves.

The AWARE profiler may be implemented as a learning database that captures information about each user in a preprocessing step that enables it to learn about the normal traffic profile for each user. This database is also correlated with other user databases for cross-mobile correlation. The information in these databases is fed to the detector, which maintains thresholds for each user and determines if traffic for a user or set of users violates the corresponding threshold.

In one embodiment, the present invention is a method and architecture for detecting a denial-of-service attack in a wireless network. A statistical measure is generated characterizing a relationship between power consumption by a mobile unit of the wireless network and data transmitted to and from the mobile unit during normal operations of the wireless network. The statistical measure is compared to a current measure of the relationship. The DoS attack is detected if the current measure differs from the statistical measure by more than a specified threshold.

In another embodiment, the present invention is a wireless network comprising (1) an access node adapted to provide access between the wireless network and an internet, (2) one or more radio network controllers (RNCs) adapted to communicate with the access node, (3) one or more base stations for each RNC and adapted to communicate with the RNC and with one or more mobile units, and an architecture adapted to perform the method of the previous paragraph.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Introduction

Figure 1:
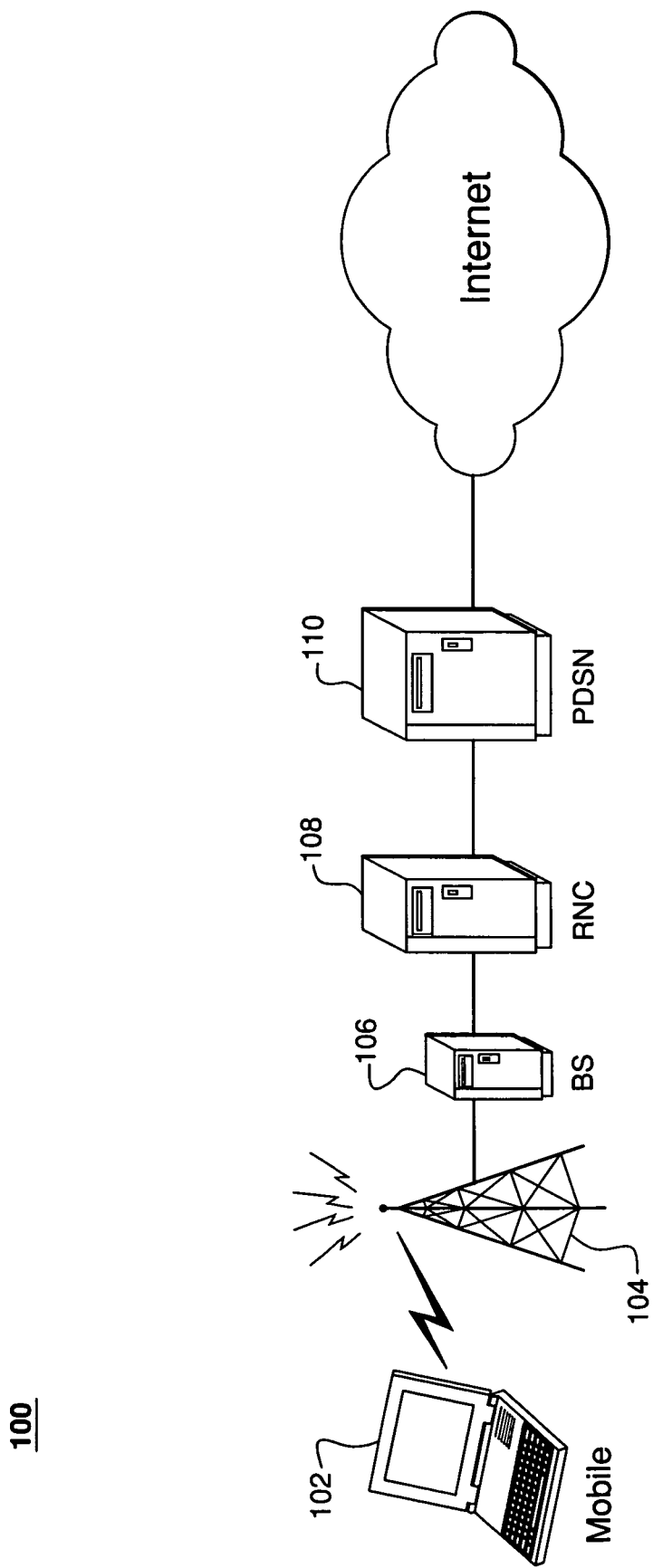
FIG. 1 illustrates an exemplary wireless network of the prior art.

FIG. 1 illustrates exemplary wireless network 100 of the prior art. Wireless network 100 includes mobile (e.g., laptop or cell phone) 102, cell tower 104, base station (BS) 106, radio network controller 108, and Packet Data Serving Node (PDSN) 110.

During normal operation, mobile 102 communicates with PDSN 110 via cell tower 104, BS 106, and RNC 108 to authenticate and register itself with the network. PDSN 110 is fundamentally a router that functions as the gateway for data flow to and from all mobiles in the wireless network. The PDSN provides access to the Internet, intranets, and applications servers for the mobile. Acting as an access gateway, the PDSN provides simple Internet protocol (IP) and mobile IP access, foreign agent support, and packet transport for virtual private networking. The PDSN further acts as a client for authentication, authorization, and accounting (AAA) servers and provides mobiles with a gateway to the IP network. The PDSN allows a mobile to move and still have packets forwarded to it.

The term "Packet Data Serving Node" and its acronym "PDSN" refer to access nodes in networks conforming to a CDMA (Code-Division Multiple-Access) standard. In UMTS networks, the PDSN analog is referred to as a Gateway GPRS Support Node or GGSN, where GPRS stands for General Packet Radio Service. As used in the claims, the term "access node" will be understood to cover both CDMA PDSN nodes as well as UMTS GGSN nodes.

When a mobile successfully authenticates and registers with the network, a point-to-point (PPP) link is set up between a PDSN and the mobile. Though not explicitly shown in FIG. 1, the architecture is hierarchical with multiple mobiles 102 being served by each tower 104, one or more towers being served by each base station 106, multiple BSs being served by each RNC 108, and finally, multiple RNCs communicating with each PDSN 110.

Batteries are typically used to power the mobiles within the network, although there are some other alternatives (e.g., solar power). In any case, mobiles are typically characterized by limited power capacity. In a typical mobile, the battery is expected to give a certain battery life under a normal set of usage conditions. Under these normal conditions, the mobile is actively used for a small fraction of time and it is idle the rest of the time. When the mobile is idle, power-management software places the mobile into a low-power standby and/or sleep mode, thereby extending its battery life. Efficient power management is crucial to the success of mobile operation because the capacity of batteries has improved very slowly (doubling only every 35 years) relative to mobile computing capacity and power consumption, which have increased relatively rapidly. It has been demonstrated that an efficient power-management algorithm can increase battery lifetime by several times.

Wireless DoS Power-Drain Attacks

Because of the limited power capacity of mobiles, a category of W-DoS attacks includes those attacks where the goal of the attack is to trigger mobiles to drain their batteries faster than normal. One way this is achieved is by making the wireless infrastructure elements (specifically, the BS and RNC) to communicate more frequently with the mobile than is necessary for basic maintenance operations such as ranging and registration. If an attacker can prevent a mobile from entering its normal low-power standby state by keeping it active, the mobile's battery life can be drastically shortened. To do this, an attacker can employ a number of different strategies, including "code injection" and "low-volume data triggering."

Code Injection Attack

Code injection involves injecting programs into mobiles that keep them busy. The programs can be either (1) legitimate, though energy-hungry, mobile applications or (2) viruses whose only task is to consume lots of energy. Although the damage due to these kinds of attacks can be severe, the defense is relatively straightforward. A virus-scan program can be used to detect and remove virus-based programs. In addition, a user can carefully inspect programs that are installed on his/her mobile and minimize the use of energy-hungry applications or customize their energy use profiles. For example, in a mobile that includes a digital camera, turning off an "always-on" or "high-brightness" display feature of the camera can substantially increase the battery lifetime.

Low-Volume Data Trigger Attack

A low-volume data trigger (LVDT) attack operates on the principle that the longer a mobile is kept active, the faster the battery will drain. This type of attack is extremely hard to defend against. A typical mobile alternates between active and idle states when connected to a wireless network. A mobile enters active state when the mobile needs to transmit or receive packets. Power-management schemes ensure that mobiles transition to idle states if no data is sent or received during a specified timeout period. An LVDT attack can involve breaking the power-management scheme by periodically sending low volumes of data to the mobile. By properly timing the packet arrivals, the attacker can keep the mobile in active mode continuously, creating an inordinately high power drain with a relatively small amount of traffic. An LVDT attack can cause severe damage, while being easy to launch and hard to detect due to the low-volume nature of the attack.

It is the LVDT attack strategy that is a focus of the present invention. The low-volume data trigger attack, also referred to herein as a battery attack, can be best understood in the context of the different states of a mobile and the power consumed in each state.

Power Off: In this state, the mobile does not consume any power.

Dormant: In this state, the mobile is powered on but is not connected to the wireless network. Since the mobile does not communicate with the wireless network (except for low-frequency paging), the mobile conserves power in this state.

Idle: This is the state that a mobile enters after connecting and authenticating itself to the wireless network. In this state, the mobile is ready to transmit and receive data but is not currently doing so. Periodically (e.g., every 20 ms in a typical 3G implementation), the mobile transmits power-control frames to the base station in order to provide information to the base station on the quality of the wireless link. A mobile consumes power in the idle state due to state due to the transmission of power-control frames. A mobile enters the dormant state if there is a period (e.g., 20 seconds) of inactivity on the wireless link when no data is transmitted or received.

Tx/Rx: In this state, the mobile is actively transmitting or receiving data. The most power is consumed in this state due to the continuous transmission and/or reception.

In general, the greater the activity at the network interface of the mobile, the more power that is consumed. A mobile will consume almost as much power in the idle state as it does in the Tx/Rx state due to the frequent use of the network interface for transmitting power-control frames while in the idle state. Further, other than when it is powered off, a mobile consumes the least amount of power in the dormant state due to the inactivity of the interface. This agrees with experimental results with a typical PDA, which show, for example, power consumption of 30 mA in the dormant state, 270 mA in the idle state, and 300 MA in the Tx/Rx state.

This suggests that an attacker can cause the maximum amount of damage by sending an amount of traffic just sufficient to keep the mobile in an active state (e.g., either the idle or Tx/Rx state). For example, experiments show that a simple "ping" attack to a mobile, where the ping is repeated just once every 20 seconds, can cause an increase in power consumption by the mobile of nearly ten times the power consumption of the mobile under normal operating conditions.

Battery Attack Characteristics

The key characteristics of the battery attack are:

Ease of launching the attack: In order to keep a mobile active, all that is required by the attacker is to send one small packet to the mobile before the idle timer timeout. If a mobile is idle (i.e., not transmitting or receiving data) for a time period x, where x is the specified idle timer timeout interval, then the mobile will transit to the dormant state.

Difficulty in detection: The low-volume nature of the attack allows the attacker to bypass many threshold-based intrusion-detection mechanisms and firewalls that filter out high-volume attack traffic such as is commonly seen in wired-network DoS attacks.

Widespread impact: A single attacker can keep many mobiles in an active state in a wireless network. In contrast, a conventional DDoS attack in a wired network would require an attacker to compromise thousands of hosts in order to be successful, especially since popular sites such as www.cnn.com and www.yahoo.com servers have such large such large bandwidth and processing capabilities.

Unlike conventional DoS attacks used in wired networks, in a wireless network, it is important to attempt to stop a battery attack before it reaches a mobile. This is because, by the time that the mobile recognized that it is under attack, a significant amount of power may already have been wasted. Therefore, it is highly desirable to have a solution that resides in the wireless infrastructure and prevents such packets from reaching the mobile.

Architecture for Wireless Attack REsistance (AWARE)

Figure 2:
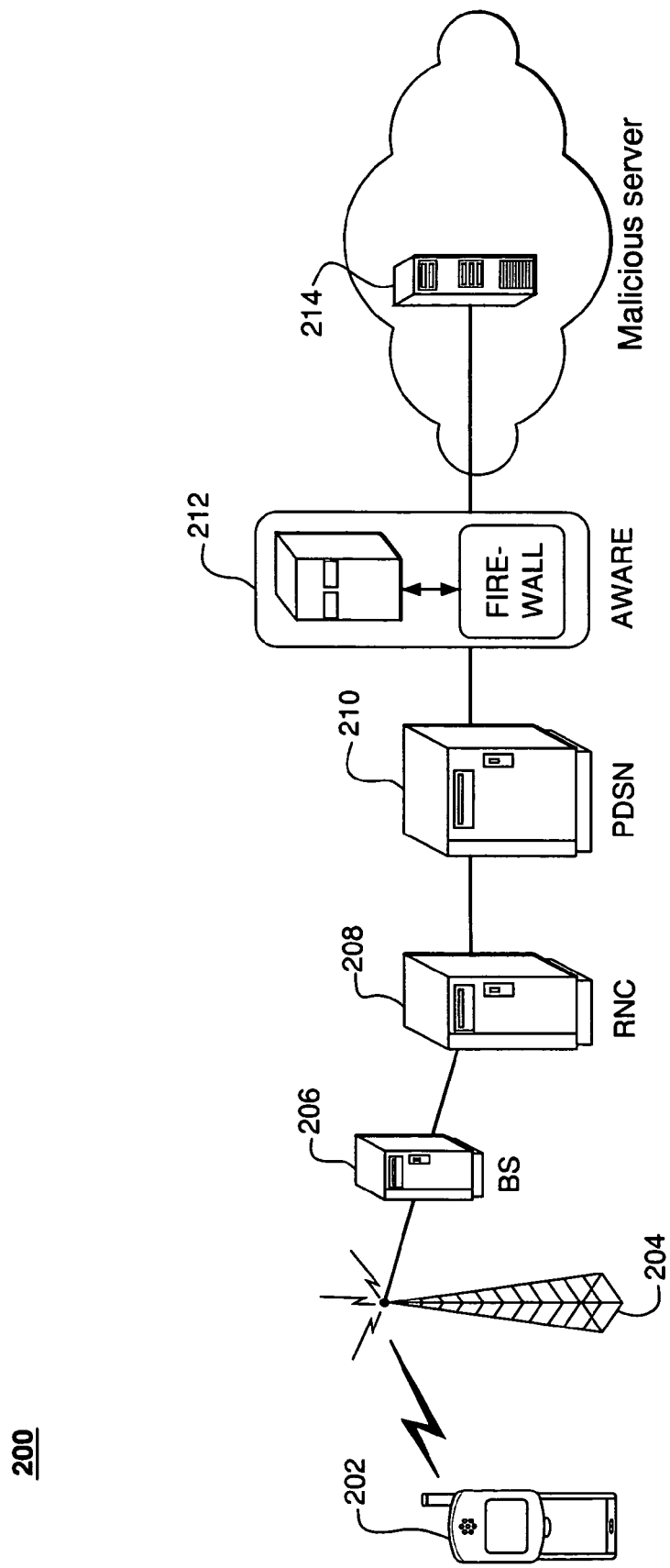
FIG. 2 illustrates an exemplary wireless network according to one embodiment of the present invention.

FIG. 2 illustrates exemplary wireless network 200 according to one embodiment of the present invention. Wireless network 200 includes elements corresponding to those in exemplary wireless network 100 of FIG. 1, namely, mobile 202, cell tower 204, base station (BS) 206, radio network controller (RNC) 208, and packet data serving node (PDSN) 210. Each of these elements of network 200 functions similarly to its corresponding element in network 100.

Wireless network 200 also includes the Architecture for Wireless Attack REsistance (AWARE) 212. Although the AWARE architecture is illustrated as being implemented co-located with a firewall between the PDSN and the Internet in FIG. 2, it should be noted that alternative implementations of the AWARE architecture are possible. As would be understood by one skilled in the art, given the following discussion, the AWARE architecture can be implemented as a stand-alone piece of hardware or as a software function co-located with one or more of the other elements of the wireless network. The operation of AWARE architecture 212 is described in more detail below.

Figure 3:
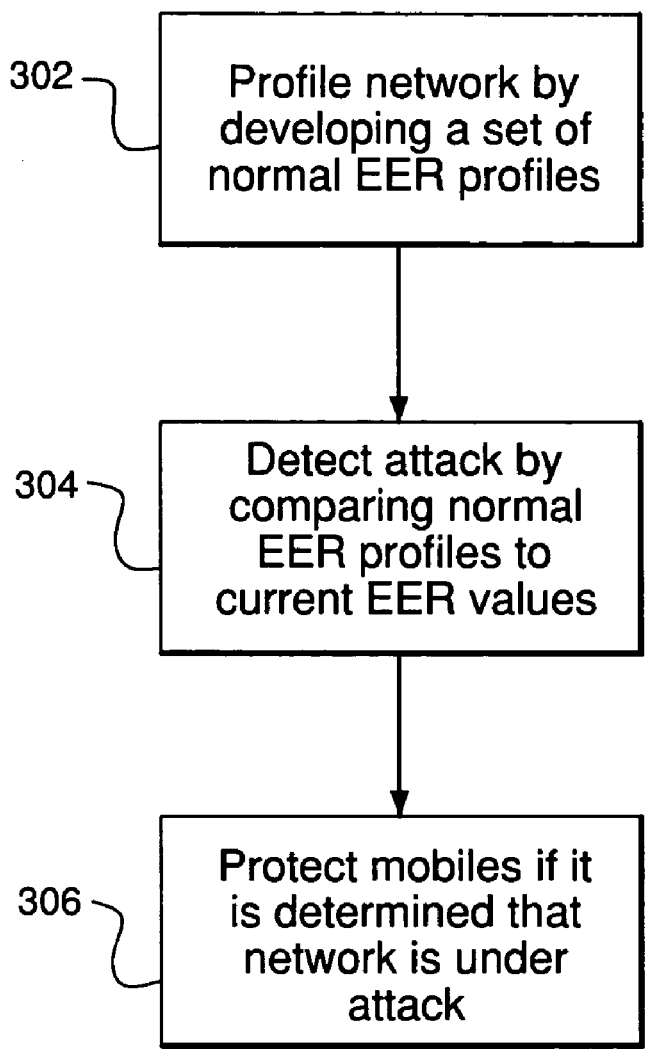
FIG. 3 illustrates the top-level functional flow for a portion of the processing performed by the Architecture for Wireless Attack REsistance (AWARE) of FIG. 2.

FIG. 3 illustrates the top-level functional flow 300 for a portion of the processing performed by AWARE architecture 212 of FIG. 2. The processing includes the steps of profiling 302, detection 304, and protection 306. In profiling step 302, the normal traffic characteristics of the network and mobiles as well as estimates of the power consumption of the mobiles are used to determine a set of normal energy efficiency ratios (EERs), where an EER is defined to be ratio of the amount of data transmitted or received by a mobile in a given interval to the amount of power spent by that mobile during that same interval. In detection step 304, actual EERs for mobiles in the network are determined. These are compared with the EERs for mobiles in the network under normal operating conditions (e.g., no attack). If the ratios deviate from the norm sufficiently, then it is assumed that an attack is underway, and in step 306, steps (e.g., dynamic filtering) are taken (e.g., dynamic filtering) are taken to protect the network. EERs can be estimated during profiling and detection for a wide diversity of communication scenarios allowing an EER-based threshold to be selected that is most relevant to the communications under analysis. As an example, a EER statistic developed for a single-user streaming audio of a given bitrate can be used to develop a threshold appropriate to that specific scenario or a set of scenarios of streaming audio over a given range of bitrates.

Energy Efficiency Ratio

The EER can be calculated in a number of different ways. For example, in a computer-implemented embodiment, the following calculation can be performed by a processor within the AWARE architecture to determine EER:

$$EER = \frac{\sum_{t=0}^{T} D_i}{\sum_{t=0}^{T} P_i} \quad (1)$$

where $D_i$ is the data size in bits of each packet i that is sent or received during a time interval T and $P_i$ is the power consumed by the transmission or reception of the ith packet.

In some embodiments, assumptions can be made to minimize the detail required to calculate an EER. For example, rather than keep track of the exact size of each packet, simply tracking the number of packets can be sufficient for some applications. Also, rather than calculating a summation of the power consumed for each packet transfer to use in the denominator of Equation (1), the total power consumed during the interval can instead be reported and captured, or a sampling of the rate of power consumption, etc. Other approaches are possible. The basic idea is to achieve an estimate of the EER under "normal" circumstances.

The set of EER values corresponds to a set of normal EER statistics parameterized for different circumstances and conditions. Additional information that may be used in building a profile for each user includes packet arrival times, IP addresses and port numbers of the sources and destinations, as well as the application-layer characteristics such as type of traffic (HTTP, RTP).

In various embodiments, the profiler aggregates statistics per-user, per-application, as well as per-server. A per-user statistic can be further categorized, for example, into per-application statistics. For instance, web surfing is a frequently used service. Similarly, a video-on-demand server may use RTP packets to broadcast video to users. Statistics on a per-web server basis can also be compiled by logging the arrival of HTTP/RTP packets.

To enable scalability, the profiles can be aggregated across users with similar behaviors. Traffic can then be compared to the aggregate profile to detect inconsistencies. Aggregate profiles can analogously be maintained for popular servers and also for popular applications.

The flexibility of using different classification approaches allows a more comprehensive and accurate characterization of what is considered as normal traffic. This profile is used to determine what is "abnormal" traffic, through the use, in one embodiment, of the EER mechanisms, while also minimizing the probability of false positives (incorrect classification of valid traffic as malicious traffic).

To detect the presence of a malicious attack, e.g., from malicious server 214 of FIG. 2, an appropriate heuristic for detection is used, such as, the power consumption for a specified amount of transmitted data is significantly higher than it is under normal circumstances. Note that, although FIG. 2 represents a DoS attack that is initiated via the Internet, DoS attacks can also be initiated within the wireless infrastructure, including at mobile endpoints. If all mobile-initiated traffic is routed to the firewall (with which the AWARE architecture is co-located), then a malicious mobile can be treated identical to a malicious server on the Internet.

It is relatively straightforward to determine the amount of traffic without involving the mobile devices. Almost any device in the wireless infrastructure that is on the path to the mobile device can calculate the amount traffic coming in and going out of mobiles given sufficient information about the mobiles. The power consumed for the traffic, however, is not as readily available without the mobile's assistance. The mobiles can be modified to communicate information about their power consumption. Alternately, the power consumption can be estimated based on the packet arrival pattern.

The most difficult part in calculating the EER is measuring the power consumption at the mobile. If the exact power consumption is needed, then the mobile has to be modified to report this information to an intermediary. However, this may be difficult in practice since the modification of mobiles involves coordination of multiple parties to standardize the interface, etc. etc. Even if the mobiles can be modified, another challenge remains as to how to separate the power consumed due to data transmission versus the power consumed due to other activities (e.g., listening to MP3s) at the mobile.

The problem is first addressed by observing that the power-consumption measurements need not be highly accurate. The important point is to be able to verify that power consumption is anomalously higher than normal. Therefore, power consumption can be estimated based on the traffic to and from the mobiles. In a CDMA network, for example, the RNC controls the transmission power of mobiles. As a result, a reasonably accurate energy consumption estimate can be obtained from the RNC, given knowledge of the packets arriving at and departing from the mobiles.

There are different possible locations for the AWARE architecture, each of which enables the detection of the battery attacks. It may appear useful for the AWARE architecture to be co-located with the BS and/or the RNC, since this would allow access to power-control information transmitted to the mobile from the BS with power recommendations for the mobile. However, since a mobile might not transmit at the recommended values, this source of power-consumption data does not necessarily provide exact values of EER. However, the EER ratio represents the energy consumed vs. the corresponding transmitted data, and need not be accurate. The goal here is not to derive an exact value of EER. Rather, the objective is to look at relative values of EER in order to detect an anomalous trend. Specifically, if the current behavior for a user does not concur with the user's average profile, then there is a high probability that an EER violation has occurred.

EER estimation by assigning randomly generated power-consumption weights for different operations will lead to the same flows being detected as compared to one that uses the real power recommendations of the mobiles. Thus, there is no accuracy gain in co-locating the AWARE architecture at any particular location as compared to any of the other possible locations in the wireless infrastructure. Since the reaction time to attacks is as important as the detection mechanism, it may be preferable to co-locate the AWARE architecture with the firewall in order to achieve the fastest reaction time.

Interface with Firewall/Gateway

In one possible embodiment, the AWARE architecture is co-located with the firewall of a wireless service provider. In this model, there are no assumptions as to any of the wireless infrastructure being aware and interacting with the AWARE architecture. The AWARE architecture uses IP-layer information such as packet arrivals and information from the IP/TCP and application-layer headers to build profiles. This assumes that the AWARE architecture can look inside a packet. If IPsec in tunnel mode has been enabled, then the AWARE architecture can be co-located with the IPsec gateway in the domain, so as to be able to decrypt and inspect packet headers and payloads.

In a relatively non-invasive architecture, the AWARE architecture looks at IP packets that are passed on to it from the firewall before they reach the PDSN. All the information is contained in the application, TPC and IP headers and the payload itself. Relevant information that is used to build the profile can be extracted from the above headers and payload.

The AWARE architecture should be able to communicate with existing firewalls or IPsec gateways. Ideally, the AWARE architecture could be co-located at these entities so as to immediately install a filter, for example, in order to block suspected traffic. If the AWARE architecture is not co-located with the IPsec gateway, a security association is established with the gateway so as to be able to decrypt and process ESP-encapsulated packets in tunnel mode. Even if the AWARE architecture is not co-located with the firewall, there typically is an interface with most commercial firewalls, such as Checkpoint's Firewall-1, that allows the configuration of filters.

The AWARE architecture can be deployed using commercial and open-source off-the-shelf equipment. For correlation, an interface to the wireless infrastructure is defined for querying wireless user state. The interface allows the AWARE architecture to communicate in a secure manner with the wireless infrastructure in order to obtain user-specific information.

For detection, an open-source IDS mechanism called Snort can be used to emulate the functionality of the AWARE architecture. Specifically, Snort correlates the information that is obtained from the wireless infrastructure. This state can also be estimated using algorithms outlined earlier. Snort can analyze network traffic for matches against a user-defined rule set and perform several actions based upon what it sees. For example, Snort can install a rule in the firewall to block all packets with headers that contain a particular source address. Snort is modular and allows new plug-ins to be installed allowing the detection mechanism to be customized and enhanced for defense against current and future attacks. Plug-in is a generic term that refers to modules that can be added dynamically to alter the behavior of Snort. For example, example, detection plug-ins can be introduced to improve the detection functionality. The detection heuristic described previously can be incorporated as a new detection plug-in in Snort.

For reaction, an interfacing plug-in called Snortsam can be used to interface with the firewall and react to detected DoS attacks. Snortsam is actually a software-based agent that runs on the firewall itself, while communicating securely with Snort. This entity uses the OPSEC standard to communicate with popular firewalls such as Checkpoint's Firewall-1, CISCO PIX. Snort can be initially used to install filters on the firewall to block malicious traffic. Subsequently, Snort can be interfaced with the wireless packet scheduler in order to reduce the priority of malicious traffic.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the claims.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method for detecting a denial-of-service (DoS) attack in a wireless network, comprising:
    (a) generating a statistical measure characterizing a relationship between power consumption by a mobile unit of the wireless network and data transmitted to and from the mobile unit during normal operations of the wireless network;
    (b) comparing the statistical measure to a current measure of the relationship; and
    (c) detecting the DoS attack if the current measure differs from the statistical measure by more than a specified threshold.

2. The invention of claim 1, wherein the statistical measure is based on a ratio of the amount of data transmitted to or from the mobile unit within a specified time interval to the amount of power consumed by the mobile unit during the specified time interval.

3. The invention of claim 2, wherein the ratio is an energy efficiency ratio EER given by:

$$EER = \frac{\sum_{t=0}^{T} D_i}{\sum_{t=0}^{T} P_i}$$

where $D_i$ is data size in bits of each packet i that is sent or received during the time interval T and $P_i$ is the amount of power consumed by the mobile unit during the transmission or reception of the ith packet.

4. The invention of claim 1, wherein:
the wireless network comprises an access node that provides access between the mobile unit and an internet; and
the DoS attack is initiated via the internet or from a mobile within the wireless network.

5. The invention of claim 1, further comprising the step of inhibiting at least certain communications with the mobile unit if the DoS attack is detected.

6. The invention of claim 5, wherein selection of the certain communications is based on source of packets associated with the certain communications.

7. The invention of claim 1, wherein the method is implemented by an architecture for wireless attack resistance within the wireless network.

8. The invention of claim 7, wherein:
the wireless network comprises an access node that provides access between the mobile unit and an internet; and
the architecture is implemented between the access node and the internet.

9. The invention of claim 1, wherein steps (a) and (b) are implemented for each mobile user in the wireless network.

10. The invention of claim 1, wherein the power consumption by the mobile unit is estimated by an architecture for wireless attack resistance of the wireless network based on packet arrival pattern for the mobile unit.

11. The invention of claim 1, wherein statistical measures are generated for each of two or more different applications implemented by the mobile unit.

12. The invention of claim 1, wherein statistical measures are generated for each of two or more different servers accessed by the mobile unit.

13. The invention of claim 1, wherein the statistical measure is aggregated for an application implemented by two or more different mobile units.

14. The invention of claim 1, wherein the statistical measure is aggregated for a server serving two or more different mobile units.

15. The invention of claim 1, wherein:
the statistical measure is based on a ratio of the amount of data transmitted to or from the mobile unit within a specified time interval to the amount of power consumed by the mobile unit during the specified time interval;
the ratio is an energy efficiency ratio EER given by:

$$EER = \frac{\sum_{t=0}^{T} D_i}{\sum_{t=0}^{T} P_i}$$

where $D_i$ is data size in bits of each packet i that is sent or received during the time interval T and $P_i$ is the amount of power consumed by the mobile unit during the transmission or reception of the ith packet;
the wireless network comprises an access node that provides access between the mobile unit and an internet;
the DoS attack is initiated via the internet or from a mobile within the wireless network;
further comprising the step of inhibiting at least certain communications with the mobile unit if the DoS attack is detected, wherein selection of the certain communications is based on source of packets associated with the certain communications;
the method is implemented by an architecture for wireless attack resistance within the wireless network;
the architecture is implemented between the access node and the internet;
steps (a) and (b) are implemented for each mobile user in the wireless network; and
the power consumption by the mobile unit is estimated by the architecture based on packet arrival pattern for the mobile unit.

16. An architecture for detecting a denial-of-service (DoS) attack in a wireless network, the architecture adapted to:
(a) generate a statistical measure characterizing a relationship between power consumption by a mobile unit of the wireless network and data transmitted to and from the mobile unit during normal operations of the wireless network;
(b) compare the statistical measure to a current measure of the relationship; and
(c) detect the DoS attack if the current measure differs from the statistical measure by more than a specified threshold.

17. The invention of claim 16, wherein:
the statistical measure is based on a ratio of the amount of data transmitted to or from the mobile unit within a specified time interval to the amount of power consumed by the mobile unit during the specified time interval; and
the ratio is an energy efficiency ratio EER given by:

$$EER = \frac{\sum_{t=0}^{T} D_i}{\sum_{t=0}^{T} P_i}$$

where $D_i$ is data size in bits of each packet i that is sent or received during the time interval T and $P_i$ is the amount of power consumed by the mobile unit during the transmission or reception of the ith packet.

18. The invention of claim 16, wherein:
the wireless network comprises an access node that provides access between the mobile unit and an internet;
the architecture is implemented between the access node and the internet;
the DoS attack is initiated via the internet or from a mobile within the wireless network; and
the architecture is adapted to inhibit at least certain communications with the mobile unit if the DoS attack is detected, wherein selection of the certain communications is based on source of packets associated with the certain communications.

19. The invention of claim 16, wherein the architecture is adapted to estimate the power consumption by the mobile unit based on packet arrival pattern for the mobile unit.

20. A wireless network comprising:
an access node adapted to provide access between the wireless network and an internet;
one or more radio network controllers (RNCs) adapted to communicate with the access node;
one or more base stations for each RNC and adapted to communicate with the RNC and with one or more mobile units; and
an architecture adapted to:
(a) generate a statistical measure characterizing a relationship between power consumption by a mobile unit of the wireless network and data transmitted to and from the mobile unit during normal operations of the wireless network;

(b) compare the statistical measure to a current measure of the relationship; and (c) detect the DoS attack if the current measure differs from the statistical measure by more than a specified threshold.

* * * * *